(12) United States Patent
James

(10) Patent No.: US 10,982,841 B2
(45) Date of Patent: Apr. 20, 2021

(54) LIGHT FRAME

(71) Applicant: ARTICULIGHT DISPLAY LIMITED, Auckland (NZ)

(72) Inventor: Mark Adrian James, Auckland (NZ)

(73) Assignee: ARTICULIGHT DISPLAY LIMITED, Auckland (NZ)

( * ) Notice: Subject to any disclaimer, the term of this patent is extended or adjusted under 35 U.S.C. 154(b) by 0 days.

(21) Appl. No.: 16/621,150

(22) PCT Filed: Jun. 22, 2018

(86) PCT No.: PCT/IB2018/054602
§ 371 (c)(1),
(2) Date: Dec. 10, 2019

(87) PCT Pub. No.: WO2018/235039
PCT Pub. Date: Dec. 27, 2018

(65) Prior Publication Data
US 2020/0200380 A1      Jun. 25, 2020

(30) Foreign Application Priority Data
Jun. 23, 2017   (NZ) ........................................ 733152

(51) Int. Cl.
| F21V 33/00 | (2006.01) |
| F21V 17/12 | (2006.01) |
| F21V 8/00  | (2006.01) |
| G09F 13/04 | (2006.01) |

(52) U.S. Cl.
CPC .......... *F21V 33/0032* (2013.01); *F21V 17/12* (2013.01); *G02B 6/0091* (2013.01); *G09F 13/0413* (2013.01)

(58) Field of Classification Search
CPC ............... F21V 33/0032; G02B 6/0091; G09F 13/0413; A47G 1/0622; A47G 1/065
See application file for complete search history.

(56) References Cited

U.S. PATENT DOCUMENTS

| 4,226,037 A | * | 10/1980 | Rodriguez | ............. A47G 1/065 |
| | | | | 248/486 |
| 4,942,685 A | * | 7/1990 | Lin | ...................... A47G 1/0622 |
| | | | | 40/546 |
| 5,457,905 A | * | 10/1995 | Kaplan | ............... G09F 13/0413 |
| | | | | 40/574 |

(Continued)

FOREIGN PATENT DOCUMENTS

| CN | 20339764 U | 1/2014 |
| JP | 3163183 U | 9/2010 |
| KR | 20110125061 | 11/2011 |

*Primary Examiner* — Gary C Hoge
(74) *Attorney, Agent, or Firm* — Foley & Lardner LLP

(57) ABSTRACT

A light frame (10) that is accessible from one side, while mounted, in order to easily replace content being displayed. The frame (10) includes a transparent front panel (11), a frame (12), a rear panel (18) and a light guide panel (15). In use, the rear panel (18) and light guide panel (15) are displaceable, e.g. by a hinge or releasable connection, from the front panel or frame to provide access from the rear through the frame to content being displayed adjacent to the front panel. When hanging (e.g. by virtue of a cable system) in a shop window, the light frame can be opened from the rear side without having to disassemble it to replace content.

18 Claims, 7 Drawing Sheets

(56) References Cited

U.S. PATENT DOCUMENTS

| | | | | |
|---|---|---|---|---|
| 5,546,687 A * | 8/1996 | Iorfida | ................. | A47G 1/0622 |
| | | | | 362/128 |
| 2002/0040541 A1 * | 4/2002 | Wang | ................... | A47G 1/0622 |
| | | | | 40/714 |
| 2005/0016045 A1 * | 1/2005 | Lasher | ...................... | G09F 1/12 |
| | | | | 40/759 |
| 2005/0117330 A1 * | 6/2005 | Chen | ................... | A47G 1/0622 |
| | | | | 362/125 |
| 2005/0201087 A1 * | 9/2005 | Ward | ................... | G02B 6/0078 |
| | | | | 362/223 |
| 2005/0259443 A1 * | 11/2005 | Lin | ...................... | G02B 6/0091 |
| | | | | 362/632 |
| 2006/0007704 A1 * | 1/2006 | Mori | ................... | G02B 6/0013 |
| | | | | 362/613 |
| 2007/0234621 A1 * | 10/2007 | McCorkle | ............... | A47G 1/065 |
| | | | | 40/773 |
| 2007/0247873 A1 * | 10/2007 | Awai | ................... | G09F 13/0413 |
| | | | | 362/618 |
| 2010/0011638 A1 | 1/2010 | Choi | | |
| 2014/0144083 A1 * | 5/2014 | Artwohl | ............... | G02B 6/0063 |
| | | | | 49/70 |

* cited by examiner

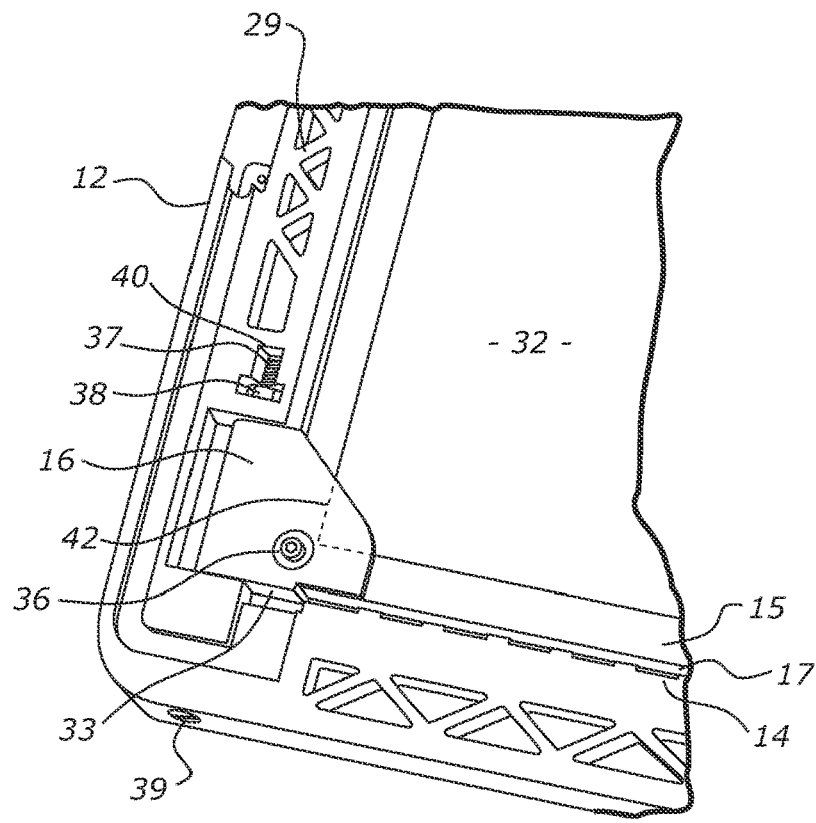
FIGURE 7
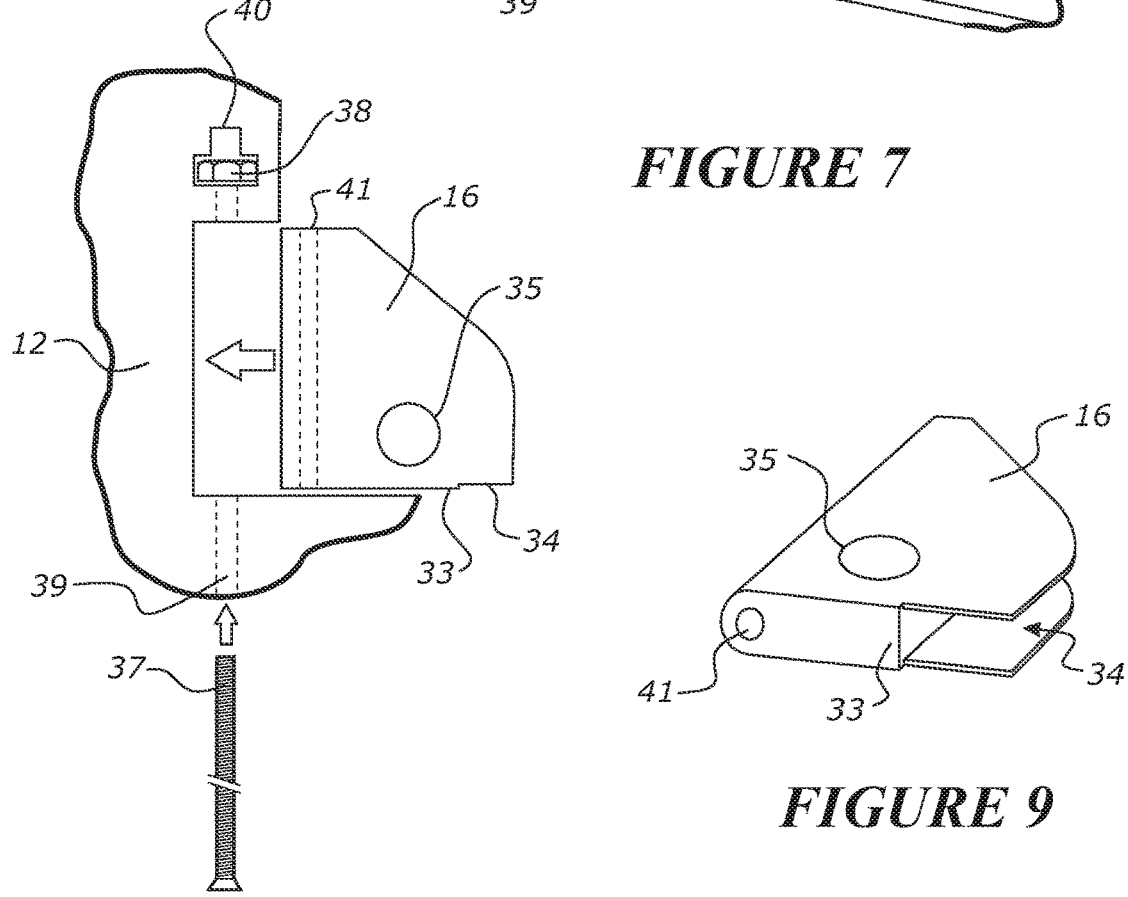
FIGURE 8
FIGURE 9

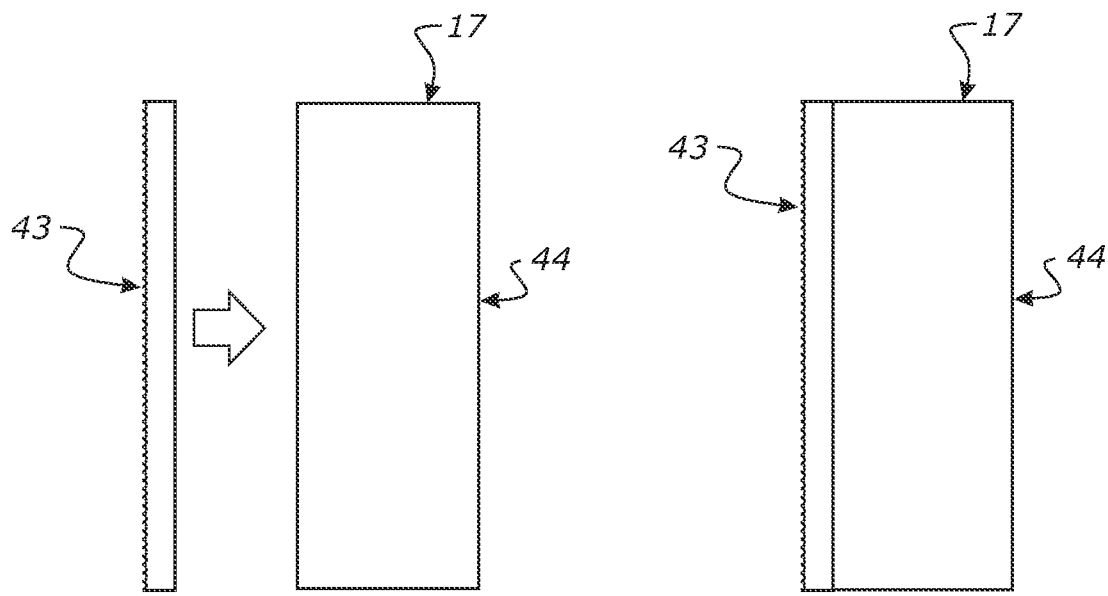
*FIGURE 11A*  *FIGURE 11B*
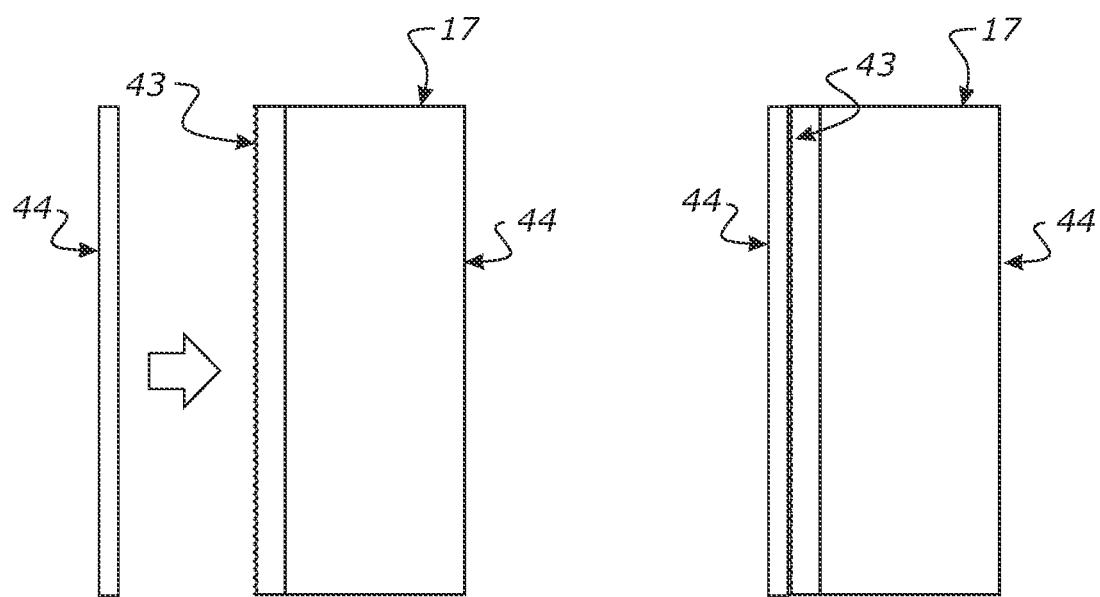
*FIGURE 11C*  *FIGURE 11D*

LIGHT FRAME

CROSS-REFERENCE TO RELATED PATENT APPLICATIONS

The present application claims the benefit of, and priority to, International Patent Application No. PCT/IB2018/054602, filed Jun. 22, 2018, which claims the benefit of, and priority to, New Zealand Patent Application No. 733152, filed Jun. 23, 2017, the contents of which are each incorporated herein by reference in their entireties.

FIELD OF THE INVENTION

The present invention relates to a light frame, particularly an edge-lit light frame, suitable for receiving sheet graphics/artwork for display.

BACKGROUND OF THE INVENTION

Light frames, also known as light boxes, are common as an advertising display means in retail and service industries. A light frame is typically formed as a sandwich of components, e.g. an outer frame or housing, a transparent front panel, printed graphics material or content, a light source/diffusion and a rear panel. It is also now common to implement a light guide panel (LGP) associated with the light source, intended to optimise the uniformity of light distribution so that the back lighting on the printed material is even, resulting in an attractive and bright front view.

Available LGPs are formed from poly(methylmethacrylate) resin, i.e. PMMA or acrylic, also known by trade names such as Plexiglass™ and Perspex™, as a flat surface upon which a dot/line matrix is either printed or etched. The panel is coupled to a light source at its edge, usually in the form of LEDs or a florescent lamp. The effect of the surface matrix is to reorient the edge-lit source to transmit across the front and rear surfaces. Reorientation of the light can be achieved for example by an internal reflection of the received light.

Artwork is typically printed on a translucent polyester film or equivalent which provides a vivid image in daylight, yet also can be illuminated from behind when the light source is activated.

Double-sided light frames/boxes are known which feature a LGP located centrally, with printed artwork mounted either side thereof, pressed against and visible through front and rear transparent panels. Double-sided light boxes can feature a single LGP or two LGPs back-to-back.

Various light box designs are available, ranging from movie theatre wall mounted advertising to shop window product displays. A particularly popular application is to feature a series of light frame displays in the window of a real estate agent where property photographs and information are displayed to catch the eye of potential buyers. It is usual to mount such displays in a hanging or cluster arrangement close to the windows glass so the display is easily visible from outside. However, a problem encountered with available light boxes is that, when positioned close to a window, access to change the printed material on the window side of the frame is difficult. This is often exacerbated by the presence of support/power cables and the close proximity of adjacent light boxes. In some cases, the lightbox display needs to be dismantled in order to change the printed material.

The requirement to regularly dismantle and reconfigure light frames, e.g. in a window display, is inconvenient and time consuming for the business.

SUMMARY OF THE INVENTION

It is an object of the invention to provide a light frame which addresses and overcomes or at least ameliorates some of the above mentioned disadvantages or which at least goes some way toward providing for a useful alternative.

In a broad aspect the present invention provides a light frame comprised of a transparent front panel, a rear panel and an edge-lit light guide panel between the front panel and rear panel, for illuminating content located at least between the front panel and the light guide panel, wherein the rear panel, and optionally the front panel, are openable to provide access to the light guide panel, and wherein the light guide panel is displaceable from the front panel in situ.

In a preferred form the light guide panel is hinged at an edge so as to be openable for providing access to a void in the frame where content (e.g. a sheet of artwork) is mounted for display. Such a hinge may be directly attached to the LGP or to a separate housing/frame around the LGP. In an alternative form the light guide panel is detachable by virtue of magnets, e.g. a magnetic strip located along an edge thereof, for coupling with an opposite polarity magnetic strip associated with a frame housing.

In one form the light frame includes a frame providing a peripheral border and holding the front, rear and light guide panels in place. However, an alternative form may integrate the frame into the front and/or rear panels, e.g. panels include mating flanges that form an enclosure for the light guide panel and associated electrical components therewithin.

In a preferred form the rear panel is additionally transparent so as to provide a double-sided display device. In the case of a double-sided display, the front panel may be fixed (e.g. to a frame), but the rear panel is removable or openable, providing access to the displaceable light guide panel within. The rear panel may be hinged to a frame or front panel; alternatively, it may be removable by some other means such as magnets or screw fasteners.

The advantage of such an arrangement is that, while the light frame is in place for display, e.g. mounted/hanging in a shop window, the user can gain access from the rear side to content adjacent the rear panel and, at the same time, the displaceable light guide panel will enable access through the frame (light box) to the content adjacent the front panel. In this way, displayed content can be removed and substituted on both sides of the light box while only one side of the light box has been opened for access. In practice, this enables a light frame to have its front face positioned closely against a window/permanent glass structure while preserving the ability to replace/update printed material/content easily and without the need to completely demount and disassemble the light frame. The invention improves utility and overcomes the difficulty of changing graphics experienced with known light frame designs.

In a preferred form, the frame includes a means of hanging extending therefrom for suspending the front panel in a displayable position, e.g. cables either side of the light frame with connectors extending from the frame to the cables. Alternatively, the cables may include a threaded connector for coupling with the front panel or frame, or the front panel/frame may feature a channel therethrough to accommodate the cable, secured in place by an interference fit or a fastener capturing the cable in the channel.

In another aspect, there is provided a light frame comprising:
- a transparent front panel;
- a mounting means for locating the front panel in a displayable position;
- a rear panel;
- a light emitting means; and
- at least one light guide panel disposed between the front panel and rear panel and configured to receive light at an edge thereof from the light emitting means for, in use, illuminating content disposed between the front panel and the at least one light guide panel;
- wherein, in use, the rear panel is displaceable to provide access to the at least one light guide panel; and
- wherein the at least one light guide panel is displaceable from the front panel and/or mounting means while the front panel is located by the mounting means in a displayable position to, in use, provide access to content disposed between the front panel and the at least one light guide panel.

In a preferred form, the rear panel is transparent such that, in use, content disposed between the rear panel and the at least one light guide panel may be illuminated.

In a preferred form, the mounting means includes a frame supporting the front panel.

In a preferred form, the front panel is fixed to the frame.

In a preferred form, the at least one light guide panel is displaceable by virtue of a hinged edge attached to the front panel or mounting means.

In a preferred form, the hinged edge is different to the edge receiving light from the light emitting means.

In a preferred form, the hinged edge comprises one or more hinge portions.

In a preferred form, the one or more hinge portions comprise a slot for receiving the at least one light guide panel.

In a preferred form, the hinged edge comprises two hinge portions disposed in line, and configured to operate together to provide a hinging axis for the at least one light guide panel.

In a preferred form, the at least one light guide panel is displaceable by virtue of at least one detachable connection disposed at an edge of the at least one light guide panel relative to the front panel or mounting means.

In a preferred form, the at least one detachable connection is one or more of the following, alone or in combination: a clip, a magnet, an interference fit, an adhesive strip, a hook and loop pad or functional equivalent.

In a preferred form, there are one or more detachable corner pieces.

In a preferred form, the one or more corner pieces comprise a recess for receiving the at least one light guide panel.

In a preferred form, the one or more corner pieces further comprise at least one stepped region or at least one region of greater internal width for receiving printed material.

In a preferred form, the rear panel is displaceable relative to the front panel by virtue of a hinged edge attached to the front panel or mounting means.

In a preferred form, the rear panel is displaceable relative to the front panel by virtue of at least one detachable connection.

In a preferred form, the at least one detachable connection is one or more of the following, alone or in combination: a threaded fastener, a clip, a magnet, an interference fit, an adhesive strip, a hook and loop pad or functional equivalent.

In a preferred form, the mounting means includes a hanging means.

In a preferred form, the hanging means comprises at least one cable for suspending the front panel in the displayable position.

In a preferred form, the cable includes a threaded connector for coupling with the front panel or mounting means.

In a preferred form, the mounting means includes a channel to accommodate the cable.

In a preferred form, there may be a fastener to secure the cable in the channel.

In a preferred form, the at least one light guide panel comprises a modified surface configured to reorient the received light (e.g. such as by internal reflection) to content disposed on the light guide panel.

In a preferred form, the modified surface comprises an etched surface matrix on one or both sides of the light guide panel.

In a preferred form, the modified surface comprises a printed surface matrix disposed on one or both sides of the light guide panel.

In a preferred form, the at least one light guide panel comprises two or more panels formed as a light guide panel assembly.

In a preferred form, the light guide panel assembly comprises at least one modified surface configured to reorient the received light to content disposed on the light guide panel assembly.

In a preferred form, the modified surface comprises an etched surface matrix on at least one side of at least one panel comprising the light guide panel assembly.

In a preferred form, the modified surface comprises a printed surface matrix disposed on at least one side of at least one panel comprising the light guide panel assembly.

In a preferred form, the modified surface is disposed between the two or more light guide panels forming the assembly as a sandwich configuration.

In a preferred form, the two or more light guide panels formed as an assembly are supported together by the one or more hinge portions and/or corner pieces.

In a preferred form, the at least one light guide panel comprises at least one substantially planar surface for receiving content.

In another aspect, there is provided a poster or content sheet supported by the light frame as described by either of the aspects or preferred forms above.

In the context of the invention 'displaceable' and 'openable' are interchangeable concepts and refer to the capacity to give access. Furthermore, the term 'comprising' as used in this specification means 'consisting at least in part of'. When interpreting statements in this specification which include that term, the features, prefaced by that term in each statement, all need to be present but other features can also be present. Related terms such as 'comprise' and 'comprised' are to be interpreted in the same manner.

The term 'front' generally refers to the primary display side of the light frame, e.g. that side facing a window or best positioned for a viewing person. The term 'rear' is generally the opposite side to the front and, in the case where the frame is closely mounted against a window, the side which is furthest from the window glass. 'Front' and 'rear' give the invention context but could be interchangeable with 'first' and 'second'.

BRIEF DESCRIPTION OF THE DRAWINGS

The invention will now be described by way of example only and with reference to the drawings in which:

FIG. 7 illustrates a first embodiment of a hinge capable of being implemented with the invention.

FIG. 8 illustrates a first view of a hinge capable of being implemented with the invention.

FIG. 9 illustrates a second view of a hinge capable of being implemented with the invention.

FIGS. 10A, 10B, and 10C illustrate first embodiments of a light guide panel capable of being implemented with the invention.

FIGS. 11A, 11B, 11C, and 11D illustrate second embodiments of a light guide panel capable of being implemented with the invention.

DETAILED DESCRIPTION

Figure 1:
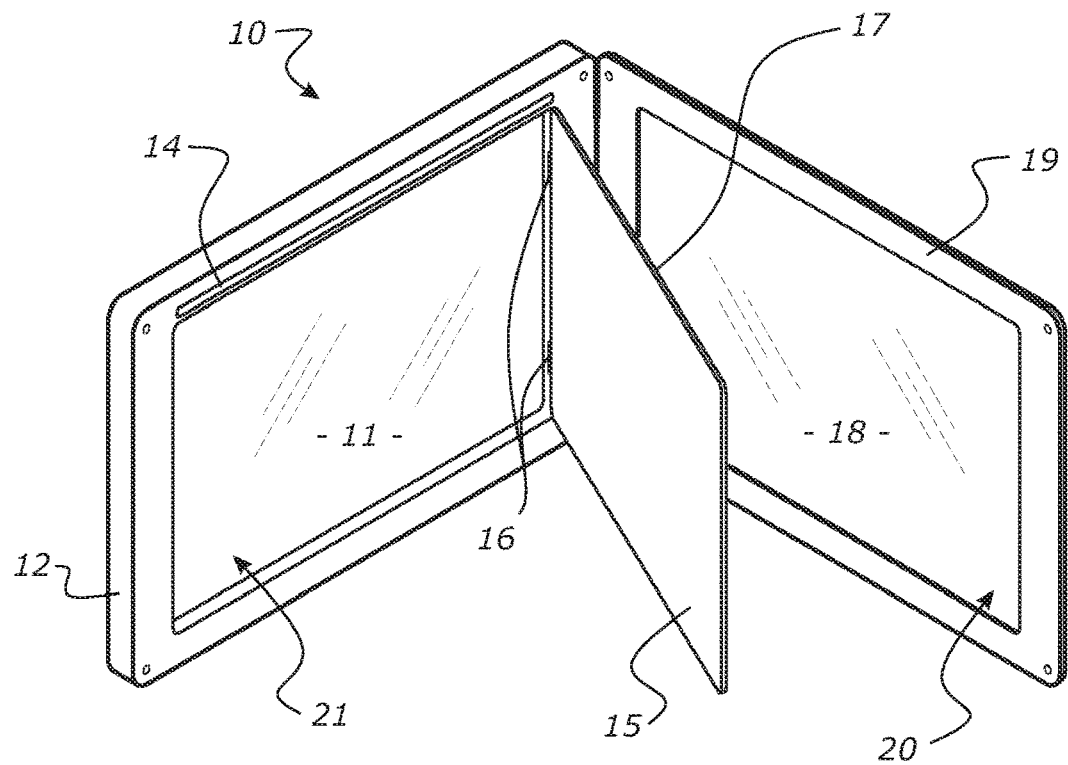
FIG. 1 illustrates a general view of a light frame according to the invention, in an open configuration.

FIG. 1 shows a general view of a preferred embodiment of the present invention. A light box or frame 10 is primarily comprised of a front panel 11 that is bordered by and attached (i.e. either permanently or removably fixed) to a supporting frame 12 which, in turn, is mountable in an appropriate location, e.g. in a shop window. The illustrated form of the frame utilises a cable suspension system 13 which is shown in further detail by FIGS. 2, 3 and 4.

In order to perform as a light frame, a light emitting means is provided at one or more edges of the frame 12 which, in the illustrated form, is an LED strip 14 located across an upper edge.

The distribution of light from the LED strip 14, suitable to provide back lighting to content placed against front panel 11, is improved by a light guide panel 15 of a general type known in the art. According to the present invention, LGP 15 is displaceable in situ from the front panel 11 which, in the preferred form illustrated, is embodied by hinges 16 at one edge so that the LGP can swing away from the front panel 11. By virtue of hinges 16, LGP 15 can generally remain attached to the total structure of frame 12 to improve convenience when replacing artwork content located against front panel 11. Preferably the LGP 15 is hinged to frame 12 at an edge different from the location of LED strip 14, leaving an exposed edge 17 free to align with LED strip 14 when the LGP is in a closed position. To be effective the alignment between the LGP and LED strip's respective edges do not have to be exact but preferably the hinge arrangement will move LGP 15 into position with relatively close accuracy. LGP 15 may be hinged directly to frame 12/front panel 11 as illustrated or be mounted in a separate frame that, in turn, is attached by a hinged edge to the frame/panel.

In the illustrated form LED strip 14 is installed within the upper edge of frame 12, however, alternative embodiments may elect to install an LED strip 14 directly to LGP 15 or a separate surrounding frame. The preference for which system to use will be apparent to a skilled person in context.

Light frame 10 further includes a rear panel 18, optionally surrounded by a frame 19. In use, rear panel 18 can be transparent and provide a second viewing face for content placed against the rear side of the LGP 15 since it transmits light in both outward directions from its main front/rear surfaces. Accordingly, the illustrated form of the invention is a double-sided light frame.

Like LGP 15, rear panel 18 is openable relative to the front panel 11, either by virtue of a hinge arrangement suggested (although not visible) by FIG. 1 or, alternatively, entirely separable where the rear panel 18/19 is removed by virtue of screw fixings, magnets or other suitable fasteners.

An openable rear panel firstly allows access to a rear portion 20 behind panel 18 within which display content can be mounted (e.g. by sandwiching said content between the inner face of panel 18 and a face of LGP 15) and visible from the rear side of the light frame. Secondly, opening the rear panel gives a user access to LGP 15 that is itself opened via hinges 16 or otherwise removable in order to provide access to a front portion 21 behind front panel 11 where display material is mounted (e.g. sandwiched between an inner face of panel 11 and a face of LGP 15). All the while, frame 12 and front panel 11 remains in place, e.g. by the cable suspension system 13, and a user is, therefore, able to gain access to both front and rear portions 20 and 21 to easily remove and replace/update content from both sides of the light frame 10 without complete disassembly being necessary. The gaps/spaces of portions 20/21 for mounting content may be very thin, for receiving and sandwiching sheet material, or have a depth to receive thicker items. Further mounting options can be provided for holding display content against front and rear panels respectively dependent on the nature of material.

The embodiment of FIG. 1 keeps all components connected together by virtue of hinge arrangements for LGP 15 and rear panel/frame 18/19, although it will be apparent that alternative solutions could be employed to achieve an approximately equivalent result. For example, magnetic strips may be provided around edges of either the LGP 15 or rear frame 19 or both to enable temporary removal of these components from magnetic strips or a metal portion upon corresponding edges/locations on front panel 11 or frame 12.

Figure 2:
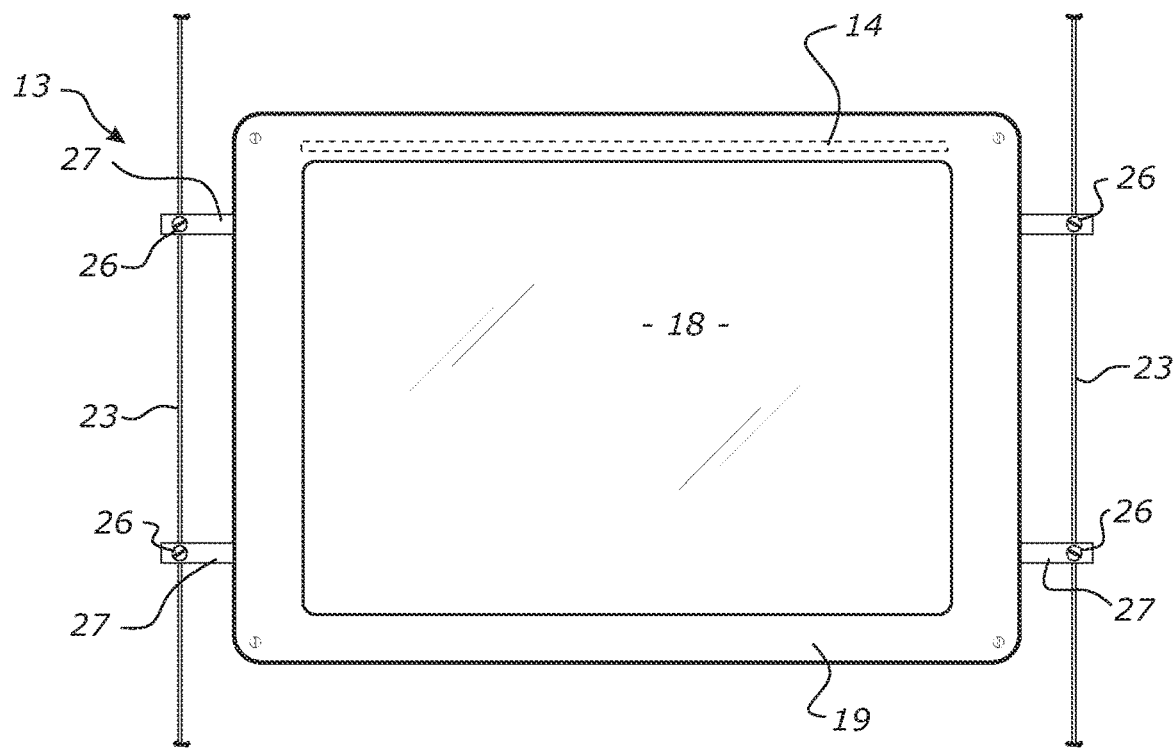
FIG. 2 illustrates a rear elevation view of an assembled or closed light frame from FIG. 1 and a first embodiment of cable suspension system relative to light frame according to the invention.
Figure 3:
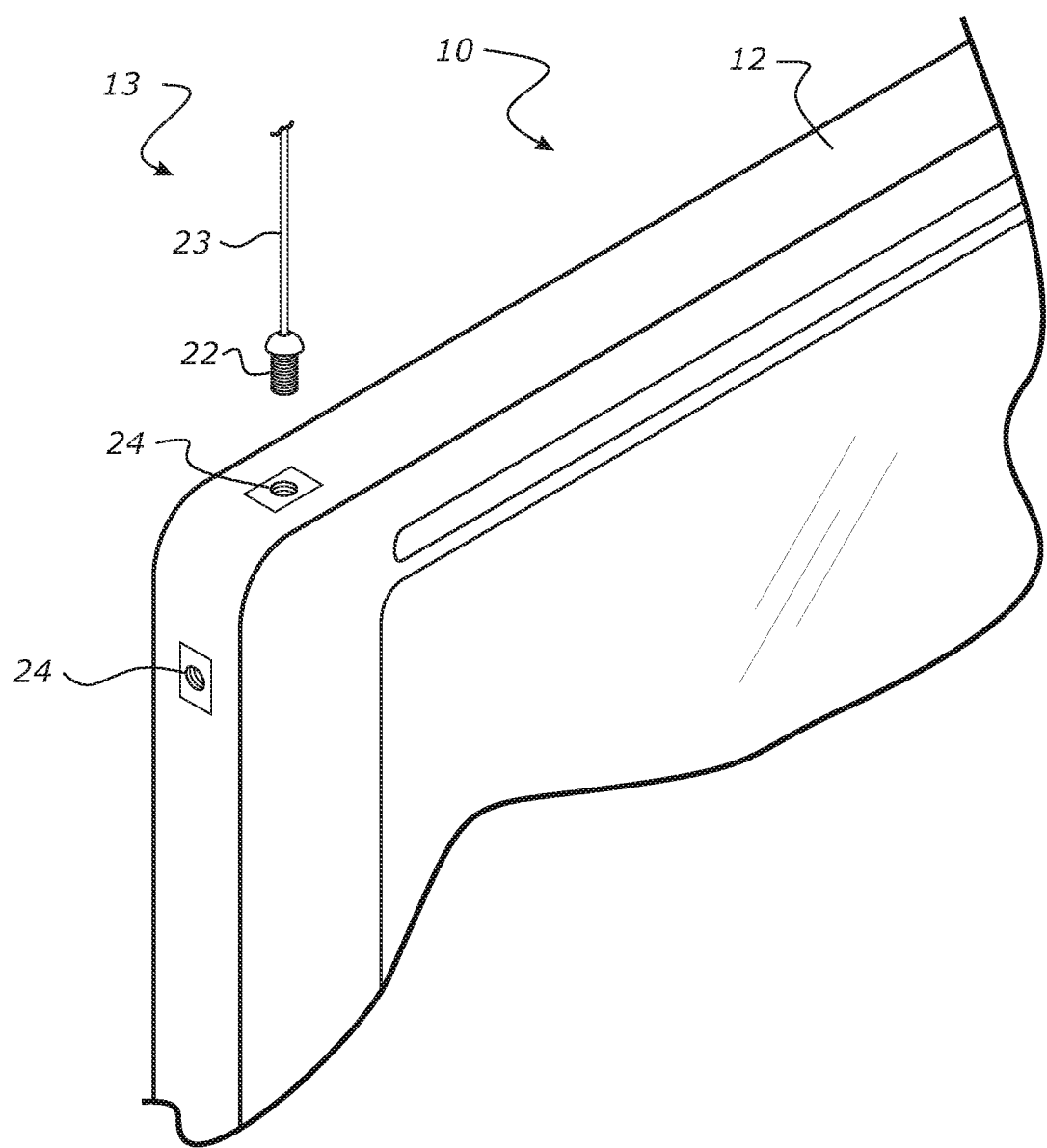
FIG. 3 illustrates a second embodiment of cable suspension system capable of being implemented with the invention.
Figure 4:
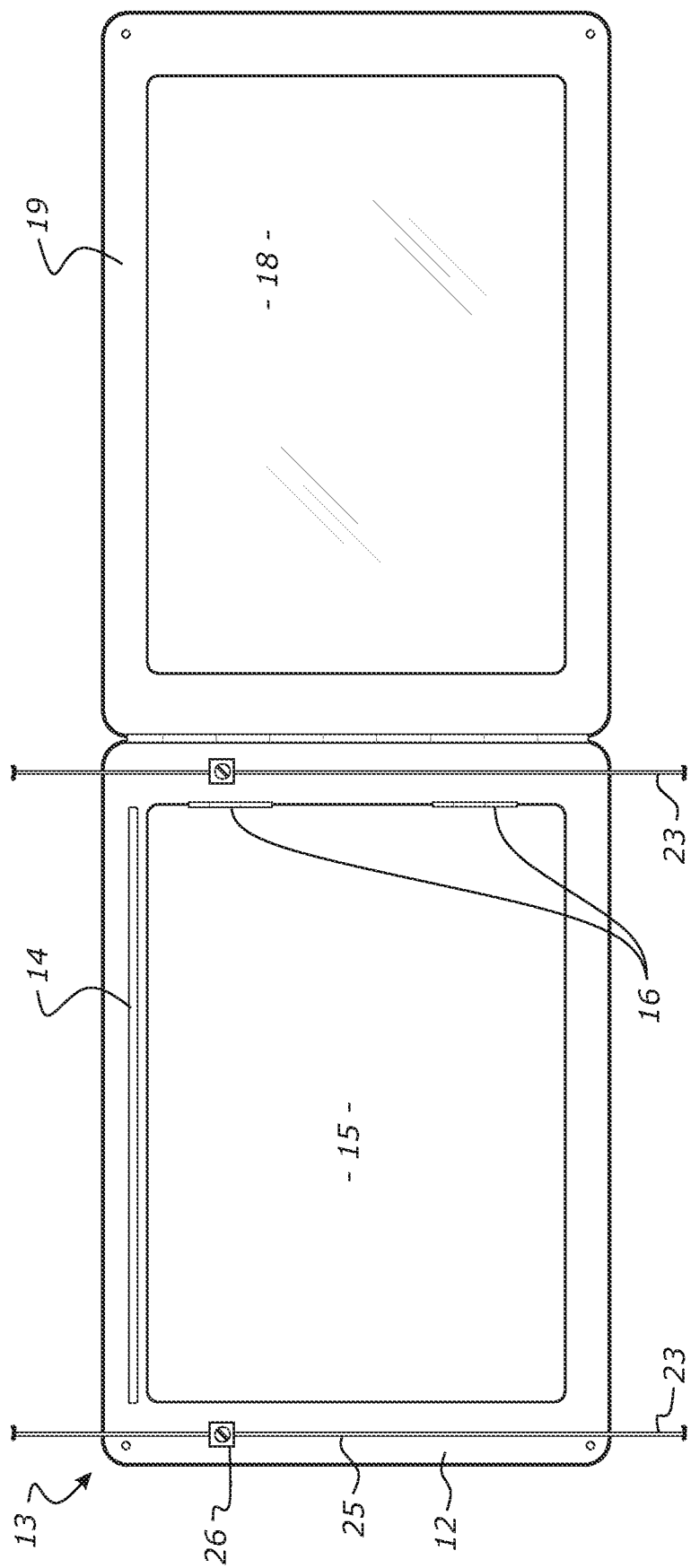
FIG. 4 illustrates a third embodiment of cable suspension system capable of being implemented with the invention.

FIGS. 2, 3 and 4 illustrate alternative examples of a cable suspension system 13. For example, FIG. 2 shows a solution where suspension wires 23 are located either side of the light frame with pairs of connector mounts 27 situated on each side of the frame and connected to the wires 23 using a suitable fastener/clamp arrangement 26. Connectors 27 could be fitted to either the long or short sides of the light frame, which would enable the frame to be displayed in both landscape (pictured) and portrait formats.

FIG. 3 shows a solution where a screw/bolt fitting end 22 of a cable/wire 23 is insertable into a threaded socket 24 associated with a side of frame 12. Preferably the end 22 is freely rotatable relative to wire 23 so it does not twist the wire during threading of the screw end. At least two, but preferably eight, such socket arrangements 24 would be needed to suspend light frame 10, two on each side of frame 12 and, furthermore, opposite ends of a suspension cable 23 can include a screw fitting 22 to enable multiple light frames 10 to be arranged in line in a vertical arrangement. Screw fittings 24 located on both the long and short sides of the light frame 10 would enable the light frame 10 to be displayed in both landscape and portrait formats. Outermost suspension wires 23 with fitting ends 22 extending from a light frame 10 will be attached to a wall, ceiling, floor, window-frame or the like mounting position to suspend the total arrangement of one or multiple light frames.

Mains power electrical connections for the LED strip 14 and associated electronics (not shown) can be built into the cable suspension system 13 to power it in a discrete manner. Alternatively, the light source could be battery operated and require periodic recharging.

FIG. 4 illustrates an alternative embodiment, shown in an open configuration where rear panel 18 is hinged to front panel 11 by the respective frames 12, 19. A suspension wire 23 is threaded or lead into a channel 25 extending all the way through an edge portion of front frame 12. An interference fit or suitable fastener/clamp arrangement 26 can be utilised to hold wire 23 in place so that light frame will be suspended in place.

As with the above example of FIG. 3, multiple light frames 10 could be arranged in line in a vertical arrangement. Likewise, electrical connections can be incorporated into the suspension system to provide discrete power to the LED strip 14 and associated electronics. Additional channels 25 and interference fits/fasteners/clamps 26 located perpendicular to those illustrated would enable the light frame to be displayed in both landscape (pictured) and portrait formats.

Figure 5:
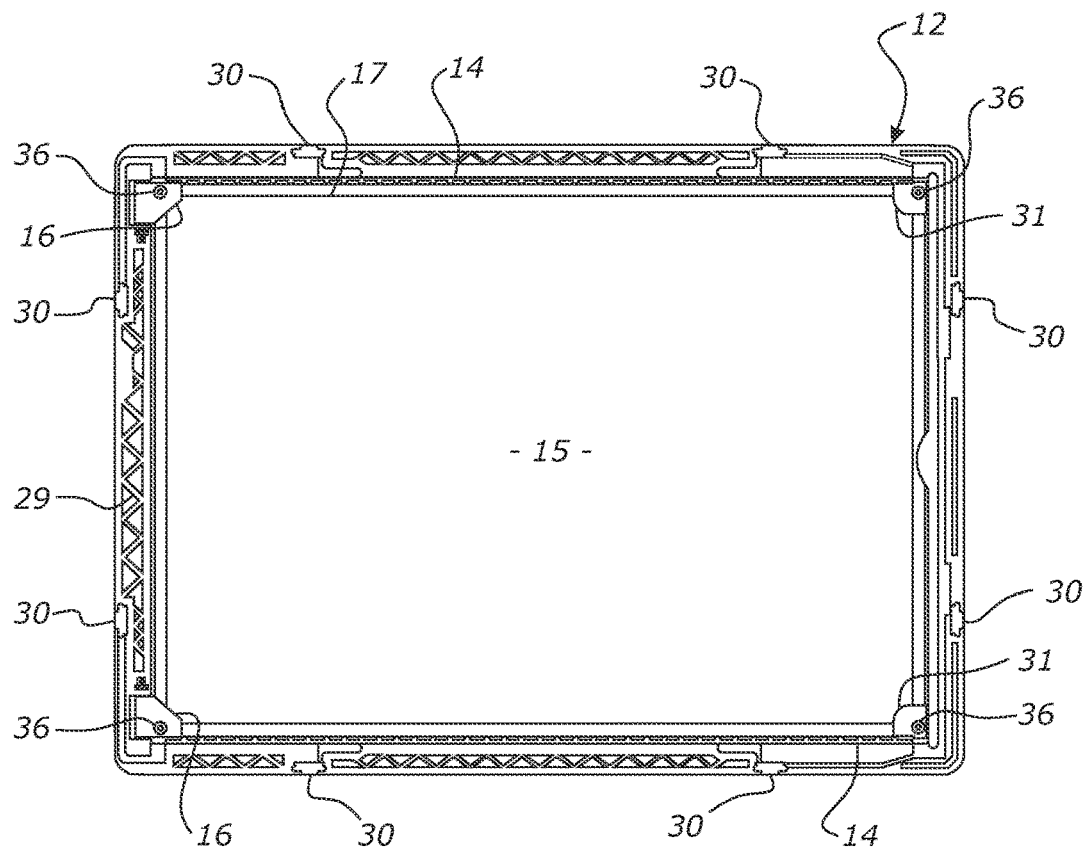
FIG. 5 illustrates a general view of the front of a light frame according to the invention.

FIG. 5 illustrates a front view of an embodiment of the present invention with the front panel removed. In this embodiment, frame 12 is shown with optional hollow sections and cross struts 29 to strengthen the frame 12. The cross struts 29 also provide a surface area to attach the front panel, for example using adhesive tape.

LED strips 14 are shown on both long edges of frame 12, and are connected to electrical contacts 30 capable of external connection to a power source. It will be apparent that LED strips 14 could also be disposed on one or both short edges of the frame 12, or in any other appropriate location for distribution of light to provide side and/or back lighting to the LGP 15. As outlined above, it will be apparent that LED strips 14 could also be connected to a self-contained power source (for example, a battery) disposed in or on the frame 12, or elsewhere in or on the light box 10. LED strips 14 and exposed edge 17 of LGP 15 are configured to align when LGP 15 is in the closed position, to illuminate the LGP 15 and any printed material or content disposed on LGP 15.

LGP 15 is shown connected to hinges 16, and corner pieces 31, thus allowing LGP 15 to rotatably hinge about hinges 16, whilst corner pieces 31 support the opposite corners of LGP 15. Optionally, corner pieces 31 provide a locating and/or locking mechanism into frame 12, ensuring LGP 15 is secured and aligned to LED strip 14 when in the closed position.

Figure 6:
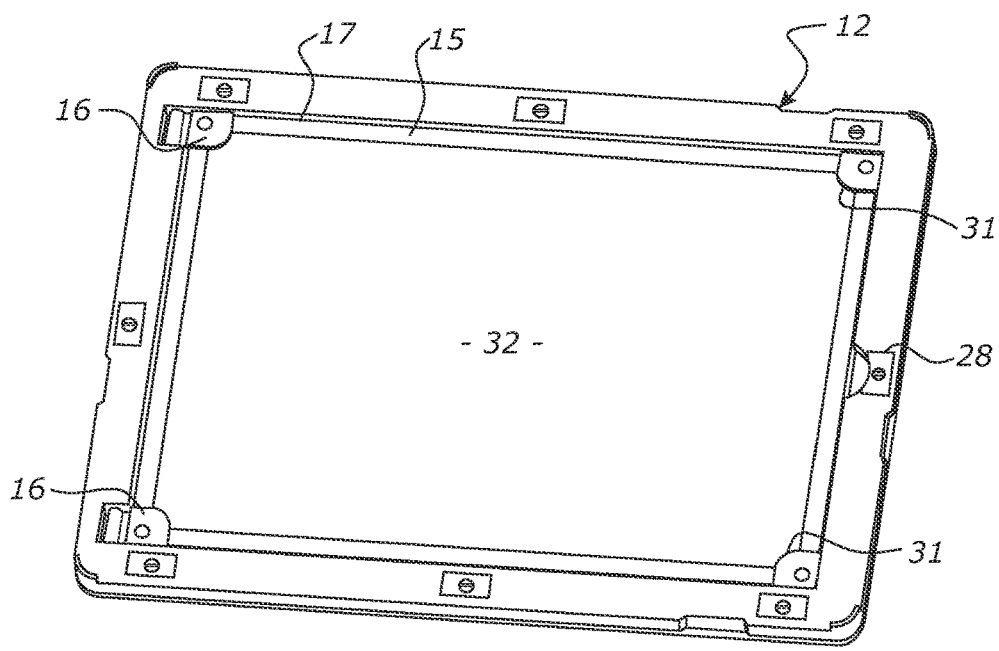
FIG. 6 illustrates a general view of the rear of a light frame according to the invention.

FIG. 6 illustrates a rear view of an embodiment of the present invention with the rear panel removed. The rear of hinges 16 and corner pieces 31 are shown supporting and locating the corners of LGP 15, as described above in relation to FIG. 5. Printed material 32 is shown attached to LGP 15, and can be illuminated via LED strips 14 illuminating exposed edge 17 of LGP 15.

In an example embodiment of FIG. 6, frame 12 is shown with magnets 28 disposed around the perimeter. Magnets 28 may be used to attach the rear panel, however in alternative embodiments the rear panel may be attached with magnets in combination with a hinge along one side, or any other suitable attachment means.

FIGS. 7 to 9 illustrate an example embodiment of the hinges 16 illustrated in FIGS. 5 and 6.

FIG. 7 illustrates an embodiment of hinge 16, which attaches to LGP 15 and locates LGP 15 and printed material 32 into frame 12. In an example embodiment, hinge 16 is shaped so as to provide for a supporting wall or retainer wall section 33, to support exposed edge 17 of LGP 15. The hinge 16 accepts LGP 15 via a slot (slot 34 in FIGS. 8 and 9), with supporting wall section 33 arranged to support a corner and/or edge of LGP 15.

In a preferred embodiment, a hinge hole or aperture (hinge hole or aperture 35 in FIGS. 8 and 9) is provided in the hinge 16, on one or both sides, and a corresponding LGP hole or aperture is provided in the corner of the LGP 15 (not shown). These hole or apertures are arranged to receive a fastener 36, such as a rivet or sex bolt, to secure and fix the LGP 15 into the hinge 16. It will be understood that any alternative fastening means may be provided to secure LGP 15 to hinge 16, either permanently or removably, for example an adhesive or adhesive tape.

In a preferred embodiment, hinge 16 comprises a fastener, such as a bolt, 37 and nut 38 to secure hinge 16 to the frame 12. Frame 12 is configured to receive said fastener, such as a bolt, and nut through a frame hole or aperture 39 and recess 40. Hinge 16 comprises a corresponding through hole or aperture (through hole or aperture 41 in FIGS. 8 and 9), and hinge 16 is configured to hinge about the fastener (such as bolt) 37. In an alternative embodiment, the fastener (such as bolt) 37 and nut 38 could be replaced with a friction fit hinge pin, or another suitable removable or non-removable fastener or hinge mechanism.

As described above in relation to FIG. 5, in a preferred embodiment two different corner pieces are provided to locate and hinge LGP 15. One is hinge 16, and the second is an un-hinged corner piece 31. Corner piece 31 may also comprise supporting wall section 33, slot 34, hinge hole or aperture 35, and fastener 36, as described in relation to hinge 16 in FIGS. 7 to 9.

In an embodiment, the hinge 16 and corner piece 31 comprises a recess 42 to hold printed material 32 or content in place on the outside of an acrylic sheet or panel of LGP 15. The hinges 16 and corner pieces 31 are shaped to hold the printed material 32 or content (e.g. poster) in the correct position on the LGP 15, allowing it to be sufficiently and evenly illuminated by LEDs 14 via exposed edge 17 of LGP 15. The recess 42 is sized and shaped to receive a corner of the printed material 32, whilst still providing support to LGP 15 via supporting wall section 33 and fastener 36. This allows content such as printed material 32 to be readily substituted without removal of hinge 16. Hinges 16 may comprise a recess 42 on both the front and rear sides, allowing content to be disposed on the front and rear of LGP 15.

FIGS. 8 and 9 show alternate views of the hinge 16 of FIGS. 5 to 7.

FIG. 8 illustrates a front view of an example embodiment of hinge 16, showing hinge hole or aperture 35 to accept a fastener (such as fastener 36 in FIG. 7), along with slot 34, and supporting wall section 33 to accept and support LGP 15. An arrow in FIG. 8 illustrates how hinge 16 is accepted into frame 12. FIG. 8 also illustrates fastener, such as a bolt, 37 and nut 38 to secure hinge 16 into frame 12 via frame hole or aperture 39 and through hole or aperture 41.

FIG. 9 illustrates a view of an example embodiment of hinge 16 showing hinge hole or aperture 35 to accept a fastener (such as fastener 36 in FIG. 7), and slot 34, and supporting wall section 33 to support and secure LGP 15. Through hole or aperture 41 is shown at the base of hinge 16, to accept a fastener, such as a bolt, (such as bolt 37 in FIGS. 7 and 8) to secure the hinge 16 to frame 12.

In an embodiment, the LGP 15 is an LGP assembly, and comprises two or more sheets of acrylic material, or two or more light guide panels 15, in a sandwich type assembly. It will be understood that any other suitable medium through which light is transmittable could form LGP 15 or LGP assembly 15, to provide illumination to a printed material disposed on the outside of said assembly. The LGP assembly 15 could be formed from two or more, or a plurality of light guide panels, acrylic sheets, or any other suitable light transmission medium.

FIGS. 10A, 10B, and 10C, and FIGS. 11A, 11B, 11C, and 11D, show example embodiments of an LGP 15 with at least one modified surface.

Figure 10C:
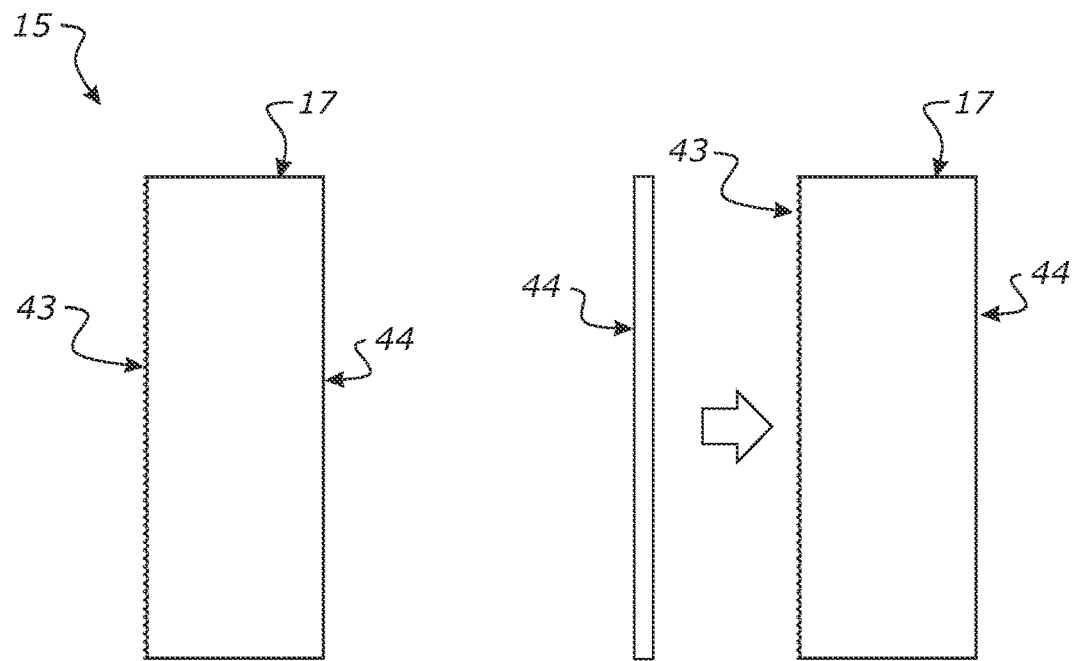
Figure 10C:
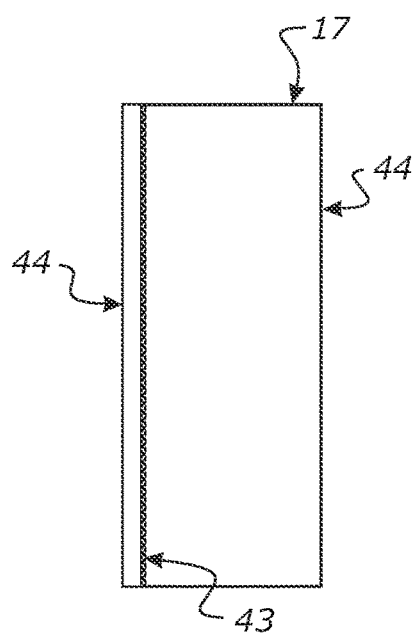

FIG. 10A shows an example embodiment of a light guide panel 15 with an etched surface matrix 43 formed on one surface. The etched surface 43 may be formed opposite substantially planar surface 44, which may be configured to receive content. It will be understood that etched surface matrix 43 could be replaced with a printed surface matrix on one or both sides of LGP 15 in FIGS. 10A, 10B, and 10C. The etched or printed surface matrix 43 acts to reorient light (e.g. such as by internal reflection) from illumination via exposed edge 17 to content disposed on one or both surfaces of the LGP 15, for example on substantially planar surface 44, to illuminate said content. The etched surface matrix 43 could be formed of dots, lines, or any other suitable pattern or surface modification for reorienting light from side illumination to surface illumination.

It has been found that if content to be illuminated (such as printed material 32) is placed against an etched or printed surface matrix of LGP 15 (such as for example etched surface 43 as described in FIGS. 10A and 10B, 10C), then the dots, lines, or pattern of the matrix may be visible through the illuminated content.

It may therefore be preferable to place the content on the opposite side 44 of the LGP 15 to the surface matrix 43. Alternatively, a second sheet, for example an acrylic sheet, or thin translucent material could be disposed on the etched surface 43 to provide a substantially planar surface to receive content. This is illustrated in FIGS. 10B and 10C.

In a preferred embodiment, a two piece LGP 15 is configured to separate the surface matrix from content disposed on the front and/or rear of the LGP 15, providing a substantially planar surface 44 on either side of the LGP 15 to receive content to be illuminated, as illustrated in FIG. 10C.

In an example embodiment, the two piece LGP 15 comprises of two sheets or panels of light transmittable material, such as for example a transparent or clear type acrylic, with at least one of the sheets or panels comprising a surface matrix 43 on one side.

The surface matrix can be sandwiched between the two sheets or panels to form LGP 15, resulting in content disposed on both the front and rear of the LGP 15 being spaced away from the pattern of the surface matrix 43. One or both sheets or panels (such as acrylic sheets or panels) could comprise a printed or etched surface matrix 43 sandwiched between the two sheets or panels, or one of the sheets or panels could be replaced by a relatively thin or thinner translucent or light transmitting type material.

Alternatively, as shown in FIGS. 11 A, B, C, and D, the surface matrix 43 could be a separate light reorientation sheet or panel arranged so as to be adjacent to another sheet or panel to form LGP 15. In the example embodiment of FIGS. 11A and 11B, content could be disposed on either side of LGP 15, but may preferably be on a substantially planar surface 44.

FIGS. 11 C and 11D show an additional sheet or panel or thin or relatively thinner translucent material disposed on surface matrix 43, providing a substantially planar surface 44 on both sides of LGP 15 to place content to be illuminated.

The hinges 16 and corner pieces 31 described in FIGS. 5 to 9 may additionally act to hold the two or more panels or sheets together to form the LGP assembly 15 described above. In this configuration or any other configuration disclosed, LGP 15 can be rotated about hinges 16, and locked into place with un-hinged corner pieces 31.

It will be apparent that a number of modifications may be possible to the general construction which still falls within the scope of the invention defined by the appended claims. For example, the front panel 11 is most likely to be in the form of a separate component and material from its surrounding frame 12, however, these components could be integrated in a single moulding. Likewise, rear panel 18 and its frame 19 could be separate or integrated components dependent on the manufacturing technique chosen. Suspension system 13 is provided merely as an example and multiple options exist for fitting a frame in a window space or similar area for display.

The materials and method of manufacture used to construct the invention are within the capabilities of a skilled person in the art. However, it is possible that future materials could be substituted for any of those examples described herein, e.g. present technology recommends Perspex™ or the like as the preferred material for a light guide panel but alternative materials or processes may supersede the present preference.

The invention claimed is:

1. A light frame comprised of:
    a transparent front panel;
    a mounting means for locating the front panel in a displayable position;
    a rear panel;
    a light emitting means; and
    at least one light guide panel disposed between the front panel and rear panel and configured to receive light at an edge thereof from the light emitting means for, in use, illuminating content disposed between the front panel and the at least one light guide panel, the at least one light guide panel displaceable by virtue of at least one detachable connection disposed at an edge of the at least one light guide panel relative to the front panel or mounting means, and further comprising one or more detachable corner pieces;
    wherein, in use, the rear panel is displaceable to provide access to the at least one light guide panel; and
    wherein the at least one light guide panel is displaceable from the front panel and/or mounting means while the front panel is located by the mounting means in a displayable position to, in use, provide access to content disposed between the front panel and the at least one light guide panel.

2. The light frame of claim 1 wherein the rear panel is transparent such that, in use, content disposed between the rear panel and the at least one light guide panel may be illuminated.

3. The light frame of claim 1 wherein the mounting means includes a frame supporting the front panel.

4. The light frame of claim 3 wherein the front panel is fixed to the frame.

5. The light frame of claim 1 wherein the at least one light guide panel is displaceable by virtue of a hinged edge attached to the front panel or mounting means.

6. The light frame of claim 5 wherein the hinged edge comprises one or more hinge portions.

7. The light frame of claim 6 wherein the one or more hinge portions comprise a slot for receiving the at least one light guide panel.

8. The light frame of claim 6, wherein the hinged edge comprises two hinge portions disposed in line, and configured to operate together to provide a hinging axis for the at least one light guide panel.

9. The light frame of claim 1 wherein the at least one detachable connection is one or more of the following, alone or in combination: a clip, a magnet, an interference fit, an adhesive strip, or a hook and loop pad.

10. The light frame of claim 1, wherein the one or more detachable corner pieces comprise a recess for receiving the at least one light guide panel.

11. The light frame of claim 10, wherein the one or more detachable corner pieces further comprise at least one stepped region or at least one region of greater internal width for receiving printed material.

12. The light frame of claim 1 wherein the rear panel is displaceable relative to the front panel by virtue of either a hinged edge attached to the front panel or mounting means, or at least one detachable connection.

13. The light frame of claim 12 wherein the at least one detachable connection is one or more of the following, alone or in combination: a threaded fastener, a clip, a magnet, an interference fit, an adhesive strip, or a hook and loop pad.

14. The light frame of claim 1, wherein the at least one light guide panel comprises a modified surface configured to reorient the received light to content disposed on the light guide panel.

15. The light frame of claim 14, wherein the light guide panel assembly comprises at least one modified surface configured to reorient the received light to content disposed on the light guide panel assembly.

16. The light frame of claim 14, wherein the at least one light guide panel comprises two or more light guide panels formed as an assembly, wherein the modified surface is disposed between the two or more light guide panels forming the assembly as a sandwich configuration, and wherein the two or more light guide panels formed as the assembly are supported together by one or more hinge portions and/or the one or more detachable corner pieces.

17. The light frame of claim 1, wherein the at least one light guide panel comprises at least one substantially planar surface for receiving content.

18. A poster or content sheet supported by the light frame of claim 1.

* * * * *